(12) United States Patent
Manabe

(10) Patent No.: US 7,372,190 B2
(45) Date of Patent: May 13, 2008

(54) DRIVING APPARATUS

(75) Inventor: Mitsuo Manabe, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/730,095

(22) Filed: Mar. 29, 2007

(65) Prior Publication Data

US 2007/0228885 A1    Oct. 4, 2007

(30) Foreign Application Priority Data

Mar. 30, 2006    (JP)    ............ 2006-094132

(51) Int. Cl.
*H02N 2/00* (2006.01)
*G02B 7/04* (2006.01)
(52) U.S. Cl. .................................. 310/328
(58) Field of Classification Search ........ 310/328, 310/348
See application file for complete search history.

(56) References Cited

U.S. PATENT DOCUMENTS

| | | | | |
|---|---|---|---|---|
| 5,140,242 A | * | 8/1992 | Doran et al. ............ | 318/640 |
| 5,589,723 A | * | 12/1996 | Yoshida et al. .......... | 310/328 |
| 5,959,516 A | * | 9/1999 | Chang et al. ............ | 334/14 |
| 6,111,336 A | * | 8/2000 | Yoshida et al. .......... | 310/328 |
| 6,114,799 A | * | 9/2000 | Yoshida et al. .......... | 310/328 |
| 7,026,746 B2 | * | 4/2006 | Audren et al. ........... | 310/328 |
| 7,074,294 B2 | * | 7/2006 | Dubrow .................. | 156/276 |
| 7,161,278 B2 | * | 1/2007 | Johansson .............. | 310/328 |
| 7,229,685 B2 | * | 6/2007 | Full et al. ............... | 428/343 |
| 2004/0071870 A1 | * | 4/2004 | Knowles et al. ......... | 427/200 |
| 2005/0181170 A1 | * | 8/2005 | Fearing et al. .......... | 428/85 |
| 2006/0221472 A1 | * | 10/2006 | Manabe et al. .......... | 359/824 |

FOREIGN PATENT DOCUMENTS

JP    7-274543 A    10/1995

* cited by examiner

*Primary Examiner*—J. San Martin
(74) *Attorney, Agent, or Firm*—Birch, Stewart, Kolasch & Birch, LLP

(57) ABSTRACT

A driving apparatus comprises: an electro-mechanical conversion element; a driving shaft that reciprocates in response to an extension and contraction of the electro-mechanical conversion element; a driven member, frictionally engaged with the driving shaft, that moves along the driving shaft by reciprocating the driving shaft; and at least one shaft support portion each including a groove portion that accommodates therein the driving shaft and a spring member that biases the driving shaft accommodated in the groove portion to a direction of the groove portion.

5 Claims, 11 Drawing Sheets

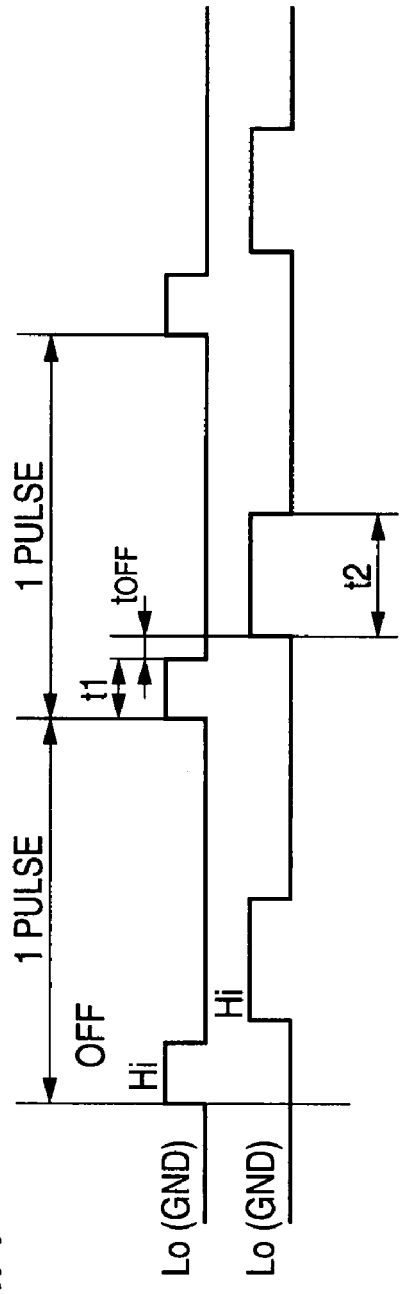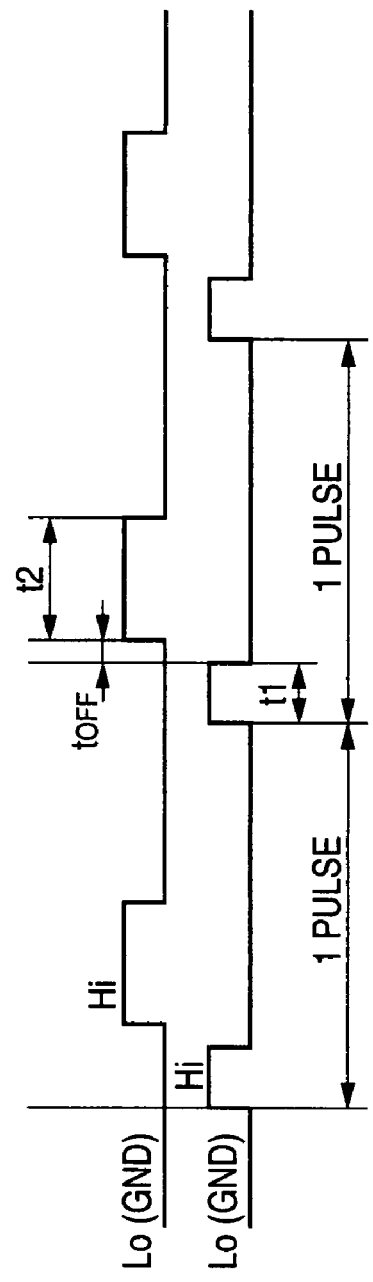
FIG. 4A
FIG. 4B

DRIVING APPARATUS

BACKGROUND OF THE INVENTION

1. Field of the Invention

The present invention relates to a driving apparatus which utilizes an electro-mechanical conversion element such as a piezoelectric element, and more particularly to a driving apparatus for driving an optical member such as a small lens which is installed on a small digital camera, a web camera or a mobile phone with a camera.

2. Description of the Related Art

The related-art lens driving apparatus which utilizes a piezoelectric element is described in, for example, JP-A-7-274543. The driving apparatus, which is described in the Japanese patent unexamined publication, is a unit for moving a lens barrel in which a driving shaft is held by the lens barrel and a friction plate therebetween, so that the lens barrel, which is a driven member, is brought into frictional engagement with the driving shaft. In addition, in this driving apparatus, the driving shaft is supported by being passed through a through holes provided in a supporting plate.

The related-art driving apparatus has, however, the following problem. Namely, in order to improve the workability in passing the driving shaft through the through hole, the cross-sectional dimension of the through hole needed to be designed to be larger than the cross-sectional dimension of the driving shaft. When such a design was adopted, the support of the driving shaft by the supporting plate could not be implemented with good positional accuracy, thereby interrupting the stable driving properties of the driving apparatus.

SUMMARY OF THE INVENTION

Then, the invention was made with a view to solving the technical problem, and an object thereof is to provide a driving apparatus in which a driving shaft can be supported in a reciprocating fashion with high positional accuracy.

According to the invention, there is provided a driving apparatus comprising: an electro-mechanical conversion element; a driving shaft that reciprocates in response to an extension and contraction of the electro-mechanical conversion element; a driven member, frictionally engaged with the driving shaft, that moves along the driving shaft by reciprocating the driving shaft; and at least one shaft support portion each including a groove portion that accommodates therein the driving shaft and a spring member that biases the driving shaft accommodated in the groove portion to a direction of the groove portion.

In this driving apparatus, the driving shaft accommodated in the groove portion of the shaft support portion is restrained from moving in a direction which intersects an axis thereof at right angles by virtue of the biasing force of the spring member. Because of this, the driving shaft can be supported in a reciprocating fashion with high positional accuracy by the shaft support portion. On top of that, since the work of passing the driving shaft through the through hole in the supporting plate can be omitted, the driving shaft can be fixed in place easily, compared to the related-art driving apparatus.

In addition, the driving apparatus may include two such shaft support portions, whereby the driving shaft is supported in a reciprocating fashion at both end portions thereof by the two shaft support portions. In other words, said at least one shaft support portion may comprise two shaft support portions, and both end portions of the driving shaft may be respectively biased by spring members of the two shaft portions. In this case, since both the end portions of the driving shaft are supported in the reciprocating fashion with high positional accuracy, the whole of the driving shaft is so supported with high positional accuracy.

Additionally, the groove portion may comprise a groove having substantially a V-shape. In this case, the driving shaft can be supported in the reciprocating fashion with higher positional accuracy.

BRIEF DESCRIPTION OF THE DRAWINGS

FIGS. 4A and 4B are diagrams showing waveforms of input signals which are inputted into the driving circuit shown in FIG. 3;

DETAILED DESCRIPTION OF THE INVENTION

Figure 1:
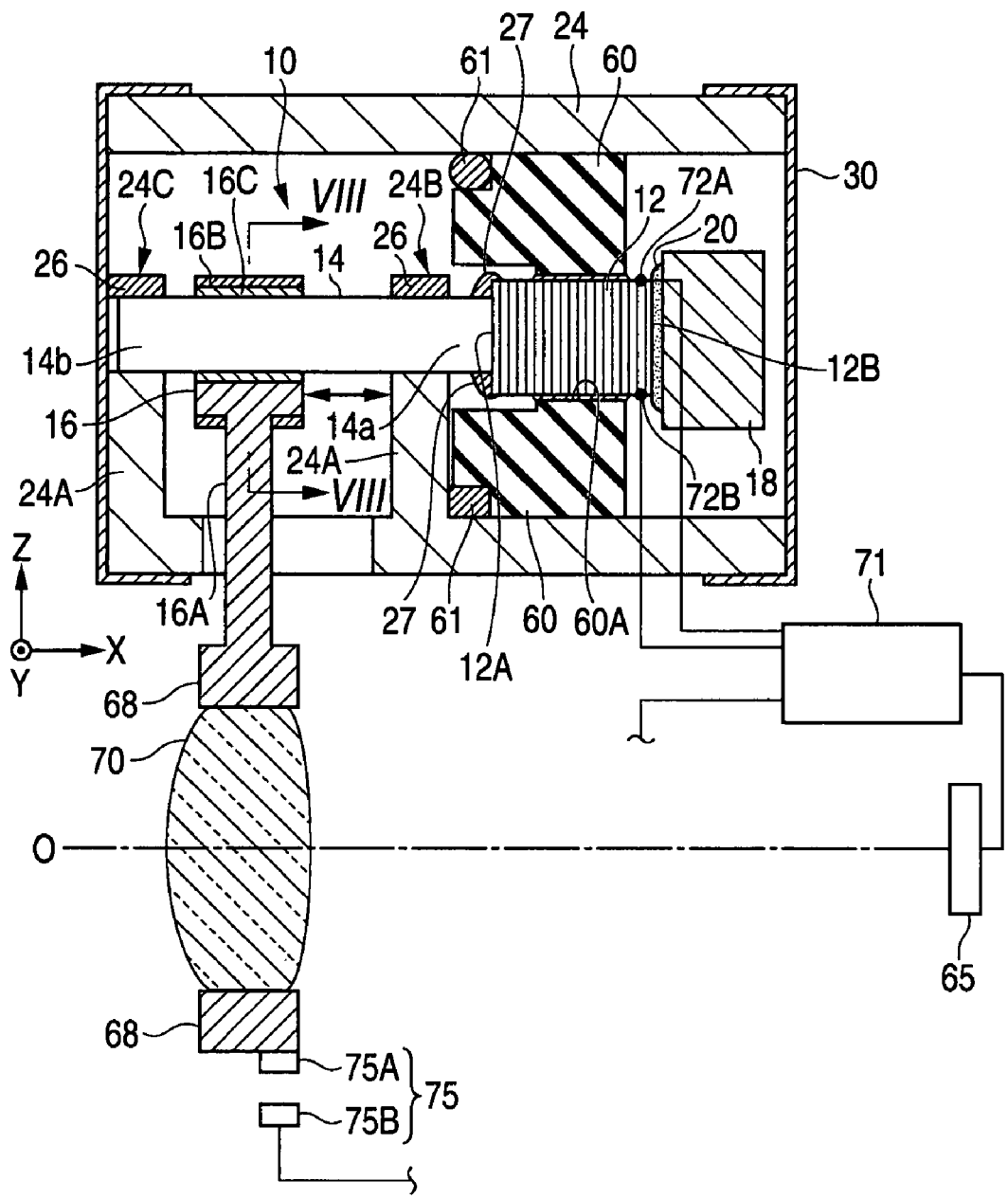
FIG. 1 is a sectional view showing a driving apparatus according to an embodiment of the invention.

Hereinafter, referring to the accompanying drawings, a best mode for carrying out the invention will be described in detail. Note that like reference numerals will be imparted to like or similar constituent elements, and the repetition of the same description will be omitted, if any.

FIG. 1 is a sectional view of a driving apparatus according to an embodiment of the invention. As is shown in FIG. 1, the driving apparatus 1 according to the embodiment is such as to drive a movable lens 70 as an object to be moved and is made up of an actuator 10 and a stationary frame 24 to which the actuator 10 is assembled.

(Actuator)

Firstly, the actuator 10 of the driving apparatus 1 will be described. The actuator 10 is made up of a piezoelectric element 12, a driving shaft 14, a driven member 16 and a weight member 18.

(Piezoelectric Element)

The piezoelectric element 12 is a stacked-type piezoelectric element and is an electro-mechanical conversion element in the invention. Two imputer terminals 72A, 72B are provided on the piezoelectric element 12, and the piezoelectric element 12 and a control unit 71 are connected to each other via these input terminals 72A, 72B. Then, the piezoelectric element 12 is caused to extend and contract in response to electric signals inputted thereinto from the control unit 71 in its stacked direction. For example, when the voltage applied to the input terminals 72A, 72B is increased and decreased in a repeated fashion, the piezoelectric element 12 repeats its extension and contraction.

(Driving Shaft)

The driving shaft 14 is fixedly bonded to the piezoelectric element 12 using an adhesive 27 in such a state that a proximal end 14a thereof is in abutment with one end face 12A of the piezoelectric element 12. The driving shaft 14 is attached to the piezoelectric element 12 in this way, whereby the driving shaft 14 reciprocates in a longitudinal direction thereof in response to repeated extending and contracting motions of the piezoelectric element 12. This driving shaft 14 is a long circular pillar-like member and is mounted in such a way that an axis of the driving shaft 14 in a direction indicated by arrows (that is, a direction of extension and contraction of the piezoelectric element 12). A light and highly rigid material is preferable as the material of the driving shaft, and although beryllium is ideal as a material which satisfies the conditions for the material of the driving shaft 14, beryllium has drawbacks that it is expensive because it is a scarce metal and is difficult to work. Then, in this embodiment, a graphite composite material such as carbon graphite is used in which graphite crystals are combined strongly and rigidly. (Here, the graphite composite material means a composite material made up of a graphite which is a hexagonal plate-shaped crystalline form of carbon and a substance other than graphite, and carbon graphite means a substance which is made up of graphite and amorphous carbon. In addition, graphite is also called black lead or plumbago.) Carbon graphite, which is a graphite composite material, has a property which is similar to beryllium (the specific weight of beryllium is about 1.85, while the specific weight of carbon graphite is about 1.8) and a property that it is easy to work, compared to beryllium.

(Weight Member)

The weight member 18 is attached to the other end face 12B of the piezoelectric element 12 with an adhesive 20 in such a state that the weight member 18 is not fixed or supported relative to the stationary frame 24. Namely, the weight member 18 is provided in such a state that it is not directly supported or fixed relative to the stationary frame 24 or it is not supported or fixed to the stationary frame 24 via an adhesive or a resin material in such a manner as to be restrained from moving. This weight member 18 is intended to prevent the end face 12B of the piezoelectric element 12 from being displaced more largely than the end face 12A by imparting a load to the end face 12B, and a member whose weight is heavier than the driving shaft 14 is preferably used for the weight member 18. In addition, by providing the weight member 18 whose mass is larger than the driving shaft 14, it is possible to transmit the extension and contraction of the piezoelectric element 12 to the driving shaft 14 side with good efficiency. For example, in a case where the driving shaft 14 is 8 mg and the piezoelectric element 12 is 30 mg, a weight member 18 of 20 mg is used. As the adhesive for bonding the weight member 18 to the piezoelectric element 12, an elastic adhesive is preferably used.

The weight member 18 is made up of a soft material, whereby a resonance frequency in the actuator 10 can be decreased sufficiently relative to a driving frequency in the piezoelectric element 12, so as to reduce the resonance effect. As a material which makes up the weight member 18, a material is used whose Young's modulus is smaller than those of the piezoelectric element 12 and the driving shaft 14 (for example, a material whose Young's modulus is 1 GPa or less is preferable, and a material whose Young's modulus is 300 MPa or less is more preferable). In addition, the specific weight of the weight member 18 is preferably as high as possible in order to reduce the size of the driving apparatus as much as possible, and the specific weight is substantially set to range, for example, from 8 to 12. Then, as a material which makes up the weight member 18, a material is used in which metallic powder whose specific weight is large is mixed into an elastic material such as rubber, and for example, a material is used in which tungsten powder is mixed into a urethane resin such as urethane rubber, and in a weight member 18 which is obtained using the aforesaid material, a Young's modulus of the order of 60 MPa and a specific weight of the order of 11.7 result. When wanting to design a weight member 18 which has as small a volume as possible, although a weight member 18 is optimum which has a combination of a large specific weight and a small Young's modulus, a weight member 18 can be used which has a specific weight (1.8 or larger) larger than that of the driving shaft 14 and a Young's modulus of 1 GPa or less. Namely, a member is suitable for the weight member 18 in which a numerical value resulting by dividing its specific weight by its Young's modulus (specific weight/ Young's modulus) is equal to or larger than $1.8 \times 10^{-9}$.

(Stationary Frame)

The actuator 10 is assembled to and supported on the stationary frame 24. Hereinafter, the support of the actuator 10 by the stationary frame will specifically be described.

(Partitioning Portion)

The actuator 10 is such that the driving shaft 14 thereof is supported by two partitioning portions (shaft support portions) 24B, 24C which are provided on a bottom portion of the stationary frame 24 in such a manner as to move in a longitudinal direction thereof. These partitioning portions 24B, 24C constitute portions which define a movable area of the driven member 16, which will be described later on, and they also function as portions which support the driving shaft 14 from thereunderneath. In addition, the stationary frame 24 functions as a box for accommodating therein the actuator 10 and also functions as a frame body or a frame member in which the actuator 10 is assembled.

Figure 9:
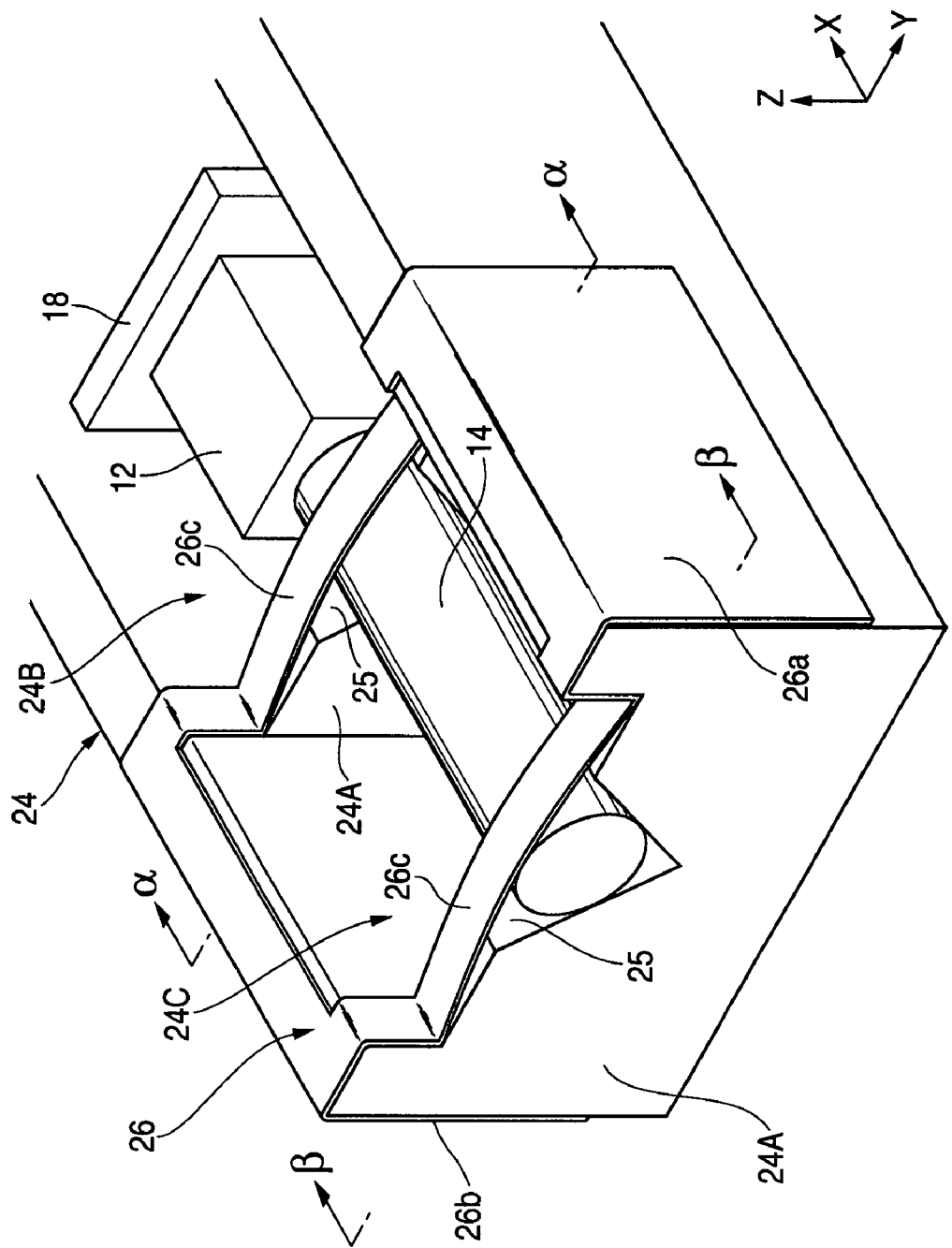
FIG. 9 is a schematic perspective view showing a supporting state of an actuator shown in FIG. 1.
Figure 10:
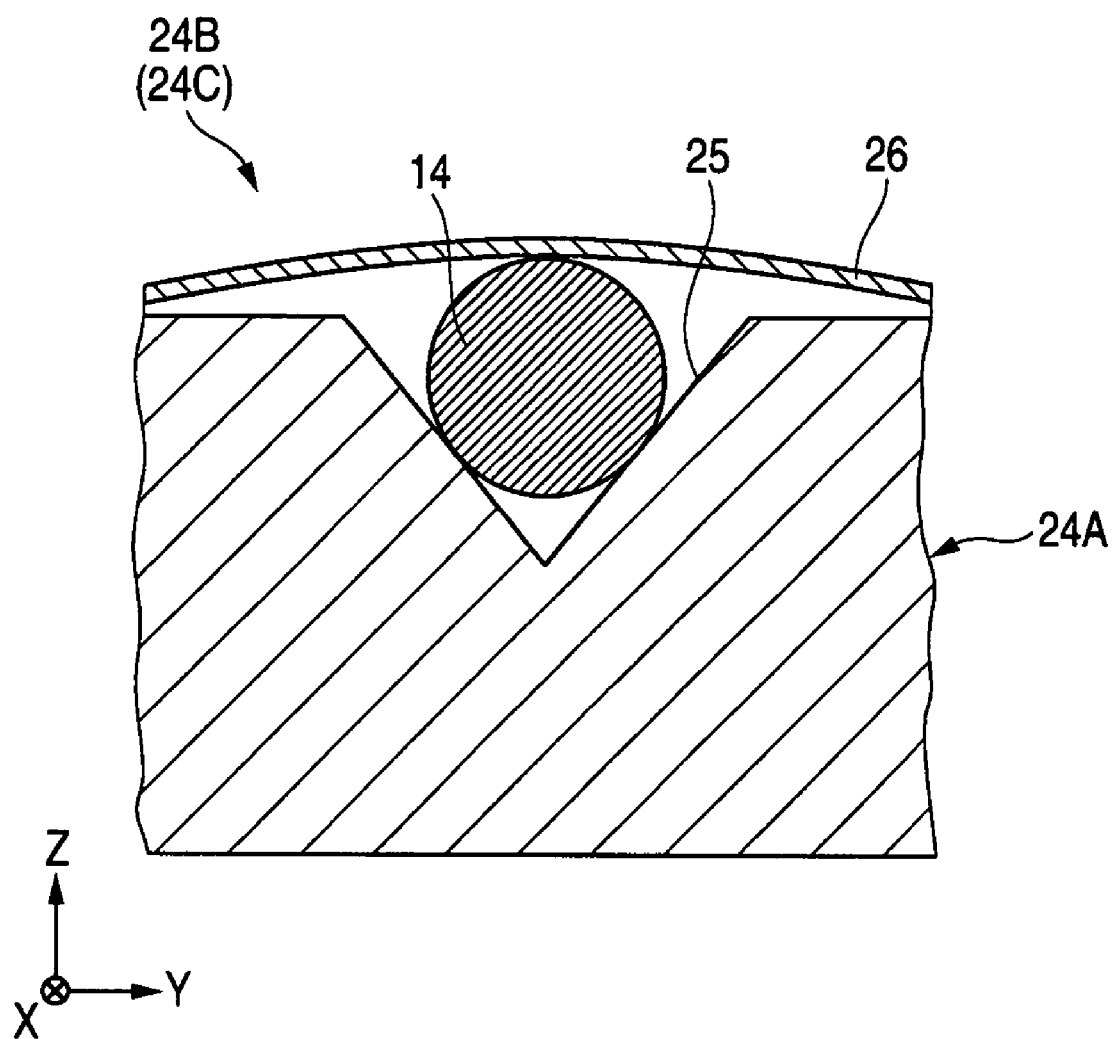
FIG. 10 is a sectional view of partitioning portions taken along the line $\alpha$-$\alpha$ and the line $\beta$-$\beta$ in FIG. 9.

As is shown in FIG. 1, the partitioning portion 24B supports the actuator 10 in the vicinity of a portion where the driving shaft 14 is attached to the piezoelectric element 12, that is, in the position of the proximal end portion 14a of the driving shaft 14, and the other partitioning portion 24C supports the actuator 10 in the position of a distal end portion 14b of the driving shaft 14. Here, the construction of the partitioning portions 24B, 24C will be described by reference to FIGS. 9 and 10. Note that FIG. 9 is a schematic perspective view which shows a supporting state of the actuator 10, and FIG. 10 is a sectional view taken along the line α-α and the line β-β in FIG. 9. As is shown in FIGS. 9 and 10, the partitioning portions 24B, 24C are each made up of a support portion (a groove portion) 24A in which a V-shaped groove 25 is formed and a spring member 26 for biasing the driving shaft 14 to a direction of the V groove 25.

The partitioning portions 24B, 24C are wall-shaped portions which are provided integrally on the bottom portion of the stationary frame 24 in such a manner as to erect therefrom, and the V-shaped groove 25 is provided in an upper end portion of each of the partitioning portions 24B, 24C in such a manner as to extend along a direction of extension of the driving shaft 14 (an X direction). Then, the spring portions 26 bias the driving shaft 14 to the direction of the support portions 24A where the V-shaped grooves 25 are formed in such a state that the end portions 14a, 14b of the driving shaft 14 are accommodated in the V-shaped grooves 25. The spring member 26 of the partitioning member 24B and the spring member 26 of the partitioning member 24C are the same member. Namely, as is shown in FIG. 9, the spring member 26 is locked to the stationary frame 24 at both end portions 26a, 26b thereof, and the biasing of the driving shaft 14 at the partitioning portion 24B and the driving shaft 14 at the partitioning portion 24C is implemented at a central portion 26C thereof which is bifurcated. Note that this spring member 26 may be replaced appropriately by two members which correspond to the partitioning portions 24B, 24C, respectively.

(Support Member)

In addition, the actuator 10 is supported on the stationary frame 24 by means of a support member 60. This support member 60 is such as to support the actuator 10 from sides thereof relative to the direction of extension and contraction of the piezoelectric element 12 and is provided between the stationary frame 24 which accommodates therein the actuator 10 and the piezoelectric element 12. In this case, the actuator 10 is preferably supported from a direction which intersects the direction of extension and contraction of the piezoelectric element 12 at right angles. The support member 60 functions as a mounting member which supports the actuator 10 from the sides thereof for mounting.

The support member 60 is formed of an elastic element having an elastic property which is equal to or larger than a predetermined level and is formed of, for example, a silicone resin. The support member 60 is made to have a through hole 60A which is provided so that the piezoelectric element 12 is passed therethrough and is assembled to the stationary frame 24 in such a state that the piezoelectric element 12 is inserted thereinto. The support member 60 is secured to the stationary frame 24 by virtue of bonding using an adhesive 61. In addition, the support member 60 is also secured to the piezoelectric element 12 by virtue of bonding using the adhesive. By making up the support member 60 of the elastic element, the support member 60 can support the actuator 10 in such a manner as to move in the direction of extension and contraction of the piezoelectric element 12. In FIG. 1, although two support members 60 are illustrated to lie on both sides of the piezoelectric element 12, respectively, these support members 60, 60 are so illustrated due to the single continuous support member 60 being shown in a sectional view which results by cutting it along a horizontal plane.

In addition, the support member 60 may be secured to the stationary frame 24 and the piezoelectric element 12 by press fitting the support member 60 between the stationary frame 24 and the piezoelectric element 12 so as to as to be pressed against by the stationary frame 24 and the piezoelectric element 12. For example, a support member 60 is made up of an elastic element into a size or thickness which is larger than a space defined between the stationary frame 24 and the piezoelectric element 12, and the support member 60 so made is press fitted into the space so as to be placed therein. As this occurs, the piezoelectric element 12 is pressed against by the support member 60 from both the sides thereof in the direction which intersects the direction of extension and contraction of the piezoelectric element 12 at right angles, whereby the actuator 10 is supported.

Note that while the support member 60 has been described as being formed of the silicone resin, the support member 60 may be made up of a spring member. For example, a spring member is interposed between the stationary frame 24 and the piezoelectric element 12 so that the actuator 10 is supported relative to the stationary frame 24 by this spring member.

(Driven Member)

Then, the driven member 16 is movably mounted on the driving shaft 14 of the actuator 10. This driven member 16 is mounted on the driving shaft 14 in such a state that the driven member 16 is frictionally engaged with the driving shaft 14, so that the driven member 16 can be moved along the longitudinal direction of the driving shaft 14. For example, the driven member 16 is mounted on the driving shaft 14 so as to be brought into engagement therewith with a predetermined friction coefficient, so as to produce a certain determined friction force when it moves by being pressed against the driving shaft 14 under a certain determined pressure. Note that the friction force between the driven member 16 and the driving shaft 14 is set such that when a voltage which changes moderately is impressed to the piezoelectric element 12, a static friction force resulting therebetween becomes larger than a driving force generated in the piezoelectric element 12 so impressed and when a voltage which changes drastically is impressed to the piezoelectric element 12, the static friction force becomes smaller than a driving force generated in the piezoelectric element 12 so impressed.

(Control Unit)

Here, referring to FIG. 2, electric signals inputted from the control unit 71 to the piezoelectric element 12 will be described in detail.

Figure 2A:
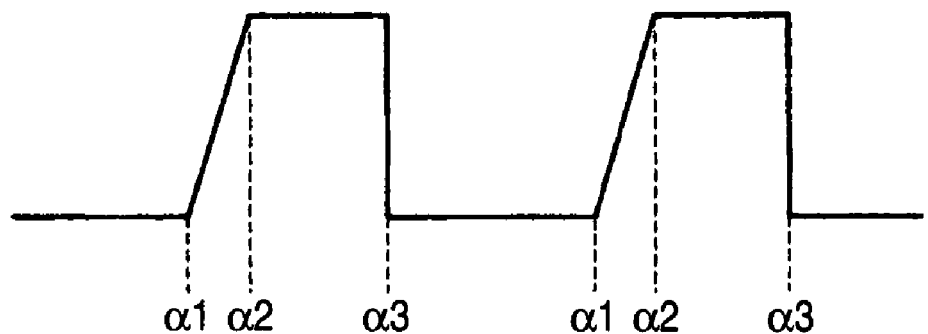
FIGS. 2A and 2B are diagrams showing waveforms of driving pulses which are impressed to a piezoelectric element shown in FIG. 1.
Figure 2B:
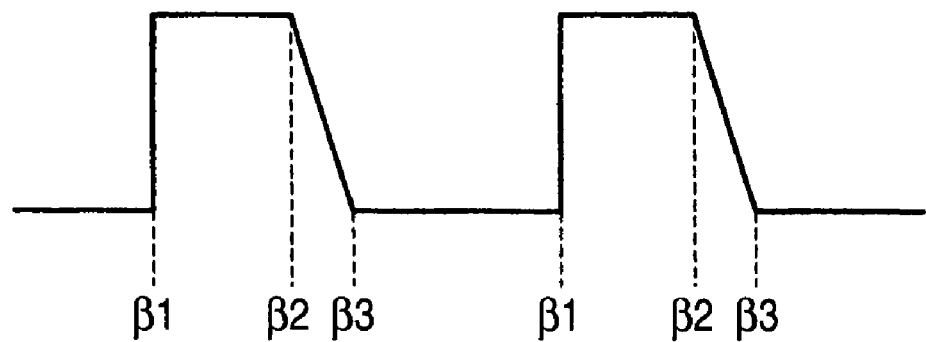

Voltages having waveforms shown in FIGS. 2A and 2B are impressed to the piezoelectric element 12 by the control unit 71. Here, FIGS. 2A and 2B are such as to shown examples of pulse waveforms which are impressed to the piezoelectric element 12. Note that FIG. 2A shows a pulse waveform used when the driven member 16 is moved in a direction indicated by an arrow pointed leftwards (that is, in a direction in which the driven member 16 moves away from the piezoelectric element 12 along the driving shaft 14), and FIG. 2B shows a pulse waveform used when the driven member 16 is moved in a direction indicated by an arrow pointed rightwards (that is, a direction in which the driven member 16 approaches the piezoelectric element 12 along the driving shaft 14).

When the driven member 16 is caused to move in the direction indicated by the arrow pointed leftwards, a substantially saw-toothed driving pulse is impressed to the piezoelectric element 12 which moderately rises from a time $\alpha 1$ to a time $\alpha 2$ and drops drastically at a time $\alpha 3$ (refer to FIG. 2A). Consequently, the piezoelectric element 12 extends moderately from the time $\alpha 1$ to the time $\alpha 2$. As this occurs, since the driving shaft 14 moves at a moderate speed, the driven member 16 moves together with the driving shaft 14, whereby the driven member 16 moves in the direction indicated by the arrow pointed leftwards in FIG. 1. Since the piezoelectric element 12 contracts drastically at the time $\alpha 3$, the driving shaft 14 moves in the direction indicated by the arrow pointed rightwards in FIG. 1. As this occurs, since the driving shaft 14 moves drastically, only the driving shaft 14 moves, while the driven member 16 remains stopped in that position because of inertia. Consequently, since the driven member 16 is caused to repeatedly move in the direction indicated by the arrow pointed leftwards in FIG. 1 and to stop when the saw-toothed driving pulse shown in FIG. 2A is impressed repeatedly, the driven member 16 can be caused to move leftwards.

On the contrary to what has been described above, when the driven member 16 is caused to move in the direction indicated by the arrow pointed rightwards, a substantially saw-toothed driving pulse is impressed to the piezoelectric element 12 which rises drastically at a time β1 and drops moderately from a time β2 to a time β3 (refer to FIG. 2B). Consequently, the piezoelectric element 12 extends drastically at the time β1, and the driving shaft 14 moves in the direction indicated by the arrow pointed leftwards. As this occurs, since the driving shaft 14 moves drastically, only the driving shaft 14 moves while the driven member 16 remains stopped in the position because of inertia. The piezoelectric element 12 contracts moderately from the time β2 to the time β3, whereby the driven member 16 can be caused to move in the direction indicated by the arrow pointed rightwards in FIG. 1. Consequently, since the driven member 16 is caused to repeatedly move in the direction indicated by the arrow pointed rightwards in FIG. 1 and to stop when the saw-toothed driving pulse shown in FIG. 2B is impressed repeatedly, the driven member 16 can be caused to move rightwards.

Note that a lubricant is applied to a sliding contact portion between the driving shaft 14 and the driven member 16 in order to stabilize the operation thereof and to increase the durability thereof when the driving shaft 14 and the driven member 16 are driven repeatedly. The lubricant is preferably such that the performance thereof is difficult to change with temperature so that a slide driving resistance between the driving shaft 14 and the driven member 16 is not increased even under low temperatures. In addition, a lubricant of a type is preferable which produces no dust which affects badly optical components and constituent components of the driving apparatus.

Figure 3:
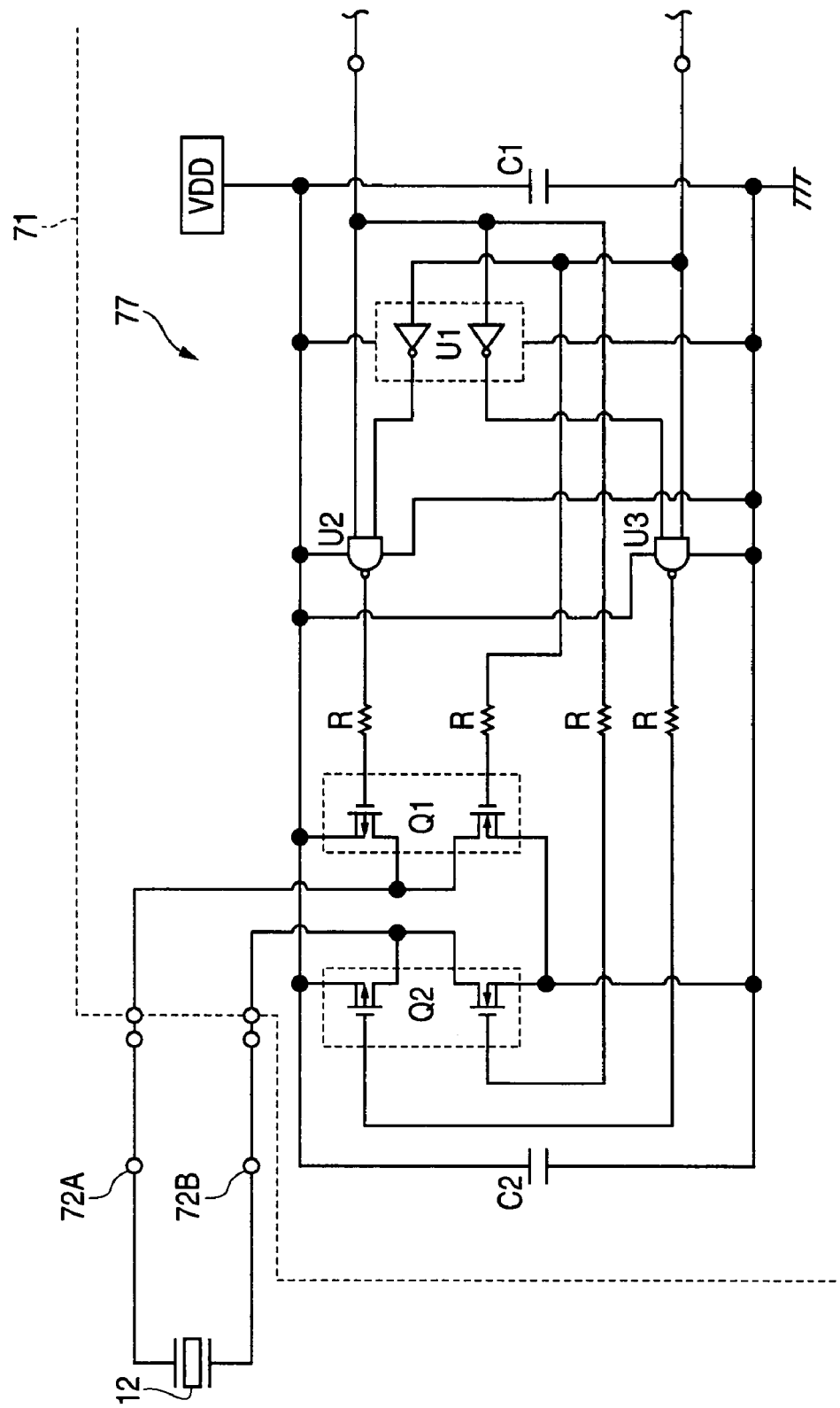
FIG. 3 is a circuit diagram showing a driving circuit of a control unit.

Note that the saw-toothed driving pulse signals that have been described heretofore are such as to have been used exemplarily for the sake of a simple description, and in reality, electric signals that are shown in FIGS. 4 and 5 are inputted and outputted by the control unit 71 which has a circuit as shown in FIG. 3. Note that an output signal becomes such as to be equivalent to the saw-toothed driving pulse that has been described above. In addition, when selecting frequencies to be used as the driving frequency by trying to avoid an audible frequency band where the driving frequency is recognized as an abnormal noise and in consideration of low consumption of power, frequencies in the range of 20 to 200 kHz are preferably used, and frequencies in the range of 50 to 100 kHz are more preferably used.

FIG. 3 is a circuit diagram of a driving circuit for operating the piezoelectric element 12.

As is shown in FIG. 3, a driving circuit 77 is provided to be disposed within the control unit 71. This driving circuit 77 is such as to function as a drive circuit for the piezoelectric element 12 and to output a driving electric signal to the piezoelectric element 12. The driving circuit 77 receives a control signal which is inputted thereinto from a control signal generating unit (not shown) of the control unit 71 and outputs a driving electric signal for the piezoelectric element 12 by amplifying the control signal with respect to voltage or current. For example, a circuit in which an input stage is made up of logic circuits U1 to U3 and field-effect transistors (FET) Q1, Q2 are provided for use as an output state is used for the driving circuit 77. The transistors Q1, Q2 are designed to be able to output, as output signals, an H output (a high potential output), an L output (a low potential output) and an OFF output (an open output).

Figure 5A:
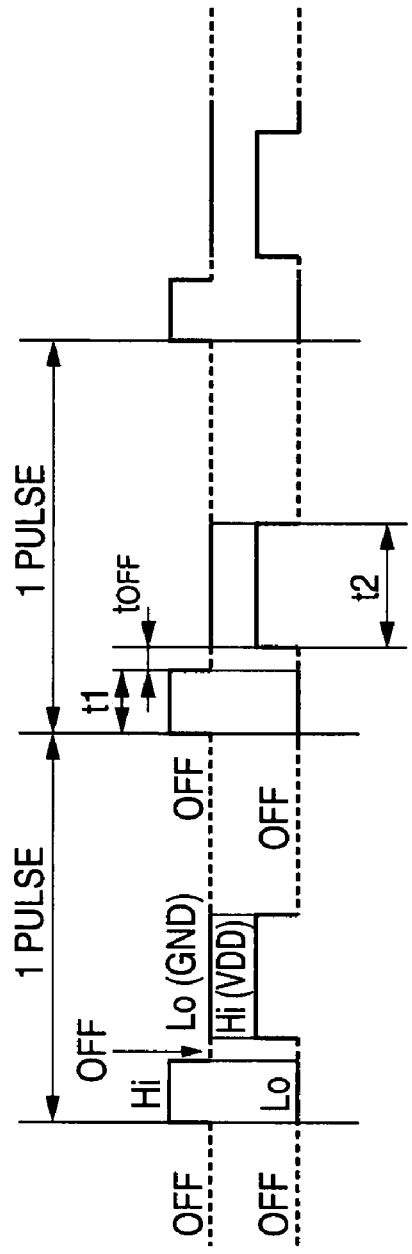
FIGS. 5A and 5B are diagrams showing waveforms of output signals which are outputted from the driving circuit shown in FIG. 3.
Figure 5B:
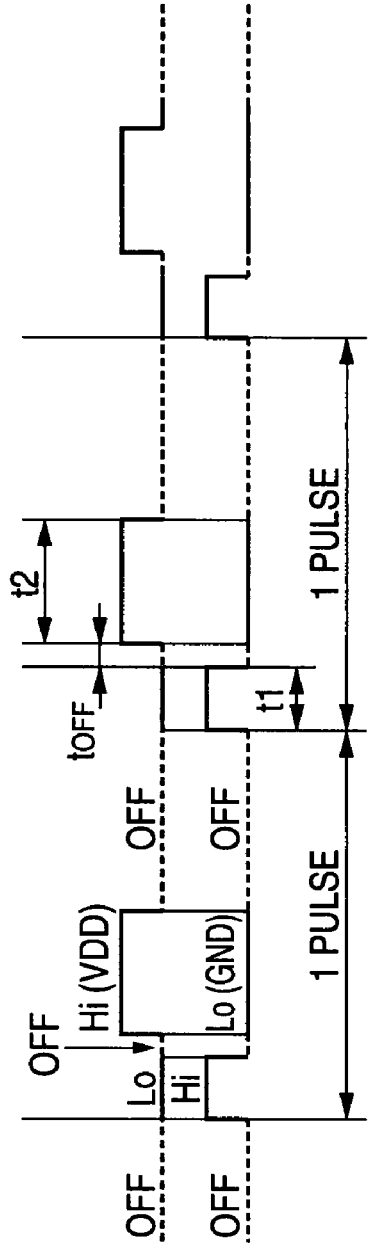

FIG. 4 shows input signals which are inputted into the driving circuit 77, and FIG. 5 shows output signals which are outputted from the driving circuit 77. FIG. 4A shows an input signal which is inputted when causing the driven member 16 to move in the direction in which the driven member 16 approaches the piezoelectric element 12 (rightwards as seen in FIG. 1), and FIG. 4B shows an input signal which is inputted when causing the driven member 16 to move in the direction in which the driven member 16 moves away from the piezoelectric element 12 (leftwards as seen in FIG. 1). In addition, FIG. 5A shows an output signal which is outputted when causing the driven member 16 to move in the direction in which the driven member 16 approaches the piezoelectric element 12 (rightwards as seen in FIG. 1), and FIG. 5(B) shows an output signal which is outputted when causing the driven member 16 to move in the direction in which the driven member 16 moves away from the piezoelectric element 12 (leftwards as seen in FIG. 1).

The output signals in FIGS. 5A and 5B are made to be pulse signals which are on and off at the same timing as the input signals shown in FIGS. 4A and 4B. The two signals in FIGS. 5A and 5B are inputted into the input terminals 72A, 72B of the piezoelectric element 12. Although signals made up of trapezoidal waveforms as shown in FIG. 2 may be inputted into the input terminals 72A, 72B, the rectangular pulse signals shown in FIG. 5 can be inputted so as to activate the piezoelectric element 12. As this occurs, since the driving signal of the piezoelectric element 12 may take the form of the rectangular pulse signal, the signal generation is facilitated.

The output signals shown in FIGS. 5A and 5B are each made up of two rectangular pulse signals having the same frequency. These two pulse signals are made to be signals in which a potential difference between respective signals increases in a stepped fashion and decreases drastically or the potential difference increases drastically and decreases in a stepped fashion by causing their phases to differ from each other. By inputting the two signals, the extension speed and contraction speed of the piezoelectric element 12 can be caused to differ from each other, whereby the driven member 16 can be caused to move.

For example, of the two signals shown in FIGS. 5A and 5B, it is set such that the other signal becomes H (high) after one signal becomes H (high) and is then decreased to L (low). In those signals, it is set such that when one signal becomes L, the other signal becomes H after a certain determined time lag $t_{OFF}$ has elapsed. In addition, in the event that the two signals are both L, the output state becomes an off state (an open state).

As the output signals or electric signals shown in FIGS. 5A and 5B which activate the piezoelectric element 12, a signal is used whose frequency exceeds the audible frequency. In FIGS. 5A and 5B, the frequencies of the two signals are made to be a signal frequency which exceeds the audible frequency, and a signal frequency of, for example, 30 to 80 kHz is preferably used, and a signal frequency of 40 to 60 kHz is more preferably used. By using signals having these frequencies, the operation noise of the piezoelectric element 12 within the audible frequency area can be reduced.

(Movable Lens)

In addition, the movable lens 70 is mounted on the driven member 16 via a lens frame 68. The movable lens 70 is such as to make up a photographic optical system of a camera and constitutes an object to be moved by the driving apparatus 1. This movable lens 70 is integrally connected with the driven member 16 and is provided in such a way as to move together with the driven member 16. A stationary lens, not shown, is provided on an optical axis O of the movable lens 70, so as to constitute the photographic optical system of the camera. In addition, a photographic device 65 is provided on the optical axis O. The photographic device 65 is a photographic unit for converting an image formed by the photographic optical system into an electric signal and is made up of, for example, a CCD. The photographic device 65 is connected to the control unit 71 and output an image signal to the control unit 71.

(Detector)

A detector 75 is provided on the driving apparatus 1 for detecting a moving position of the driven member 16. As the detector 75, for example, an optical detector is used, and a photoreflector, photointerrupter or the like is used. To be specific, in a case where a device including a reflector 75A and a detecting unit 75B is used as the detector 75, the reflector 75A is attached to the lens frame 68 which is formed integrally with the driven member 16, whereby a detection light is emitted from the detecting unit 75B to the reflector 75A side, and a reflection light which is reflected by the reflector 75A side is then detected by the detecting unit 75B so as to detect the moving position of the driven member 16 and the movable lens 70.

The detecting unit 75B is connected to the control unit 71. An output signal of the detecting unit 75 is inputted into the control unit 71. The control unit 71 is such as to control the whole of the driving apparatus, and is made up of, for example, a CPU, a ROM, a RAM, an input signal circuit, an output signal circuit and the like. In addition, the control unit 71 includes a driving circuit for activating the piezoelectric element 12 for operation, and a driving electric signal is outputted to the piezoelectric element 12 by this driving circuit.

Figure 6:
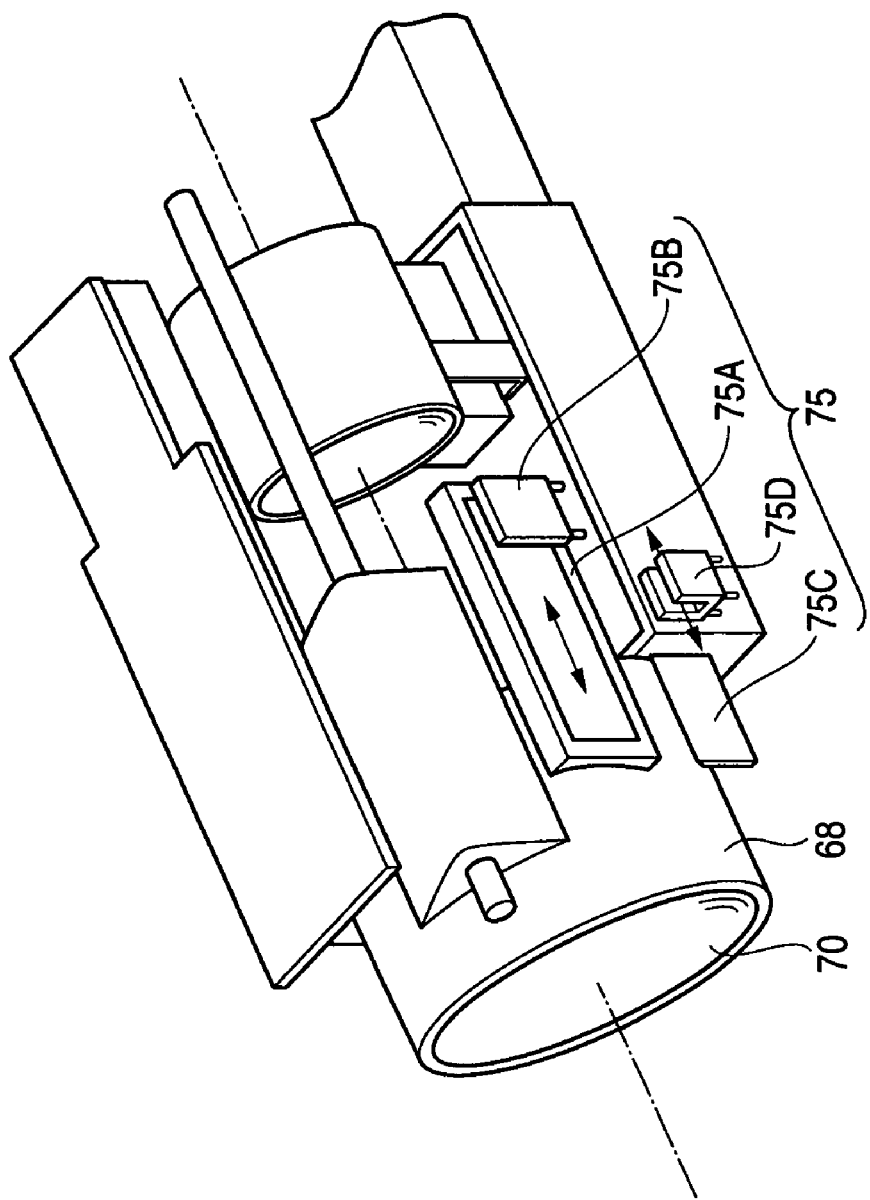
FIG. 6 is a perspective view showing a position detector of the driving apparatus shown in FIG. 1.
Figure 7:
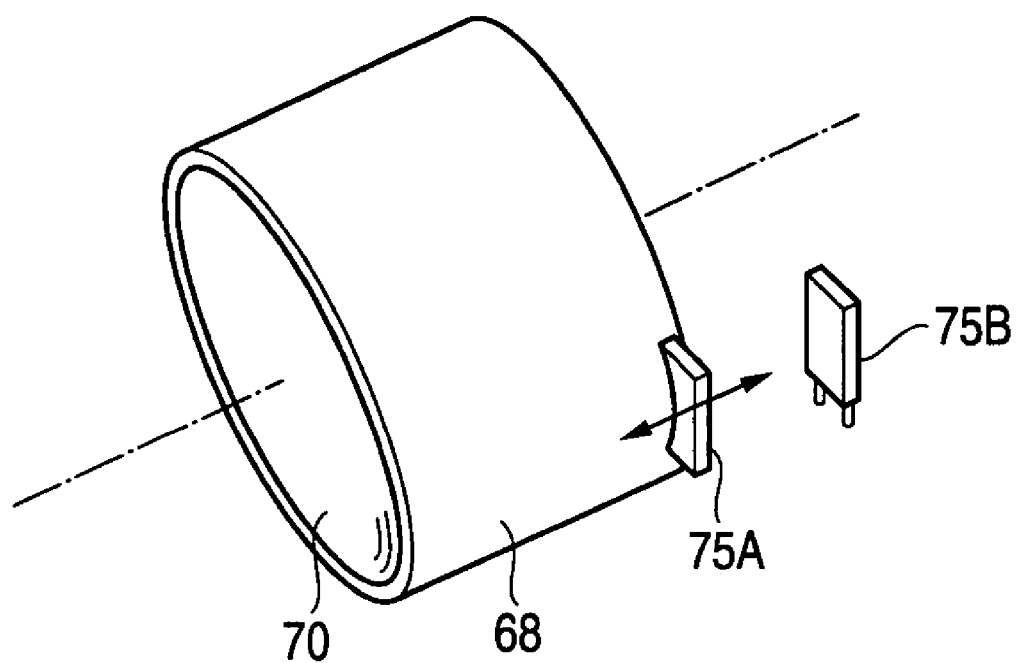
FIG. 7 is a diagram showing a modified example of a position detector of the driving apparatus shown in FIG. 1.

FIGS. 6 and 7 are drawings which show specifically a detector on the driving apparatus 1 according to the embodiment.

As is shown in FIG. 6, the detector 75 is made up of, for example, the reflector 75A, the detecting unit 75B, an interrupter 75C and a detecting unit 75D. The reflector 75A and the interrupter 75C are mounted on the lens frame 68 and are adapted to move in conjunction with the lens frame 68 and the movable lens 70. The detecting unit 75B is disposed in a position which faces the reflector 75A. The detecting unit 75B detects an amount of light reflected from the reflector 75A which changes as the movable lens 70 moves, so as to detect a moving amount of the movable lens 70. The detecting unit 75D is disposed in a position by which the interrupter 75C passes. The detecting unit 75D detects the passage of the interrupter 75C, so as to detect the passage of a predetermined position on the movable lens 70.

In addition, as is shown in FIG. 7, the reflector 75A and the detecting unit 75B may be disposed in such a manner that the reflector 75A approaches or moves away from the detecting unit 75B accordingly as the movable lens 70 moves, so as to detect a moving position of the movable lens 70 according to a relative distance of the reflector 75A to the detecting unit 75B. In this case, the position of the movable lens can be detected in a linear fashion.

In addition, as a method of controlling the movement of the movable lens 70, the movable lens 70 may be caused to move based on an output signal of the photographic device 65. For example, a high frequency component of an image signal which is outputted from the photographic device 65 is detected, and the movable lens 70 is caused to move a position where the level of the high frequency component so detected becomes maximum. The detection of the position of the driven member 16 and the movable lens 70 by the detector 75 is made unnecessary by controlling the movement of the movable lens 70 in the way just described.

Figure 8:
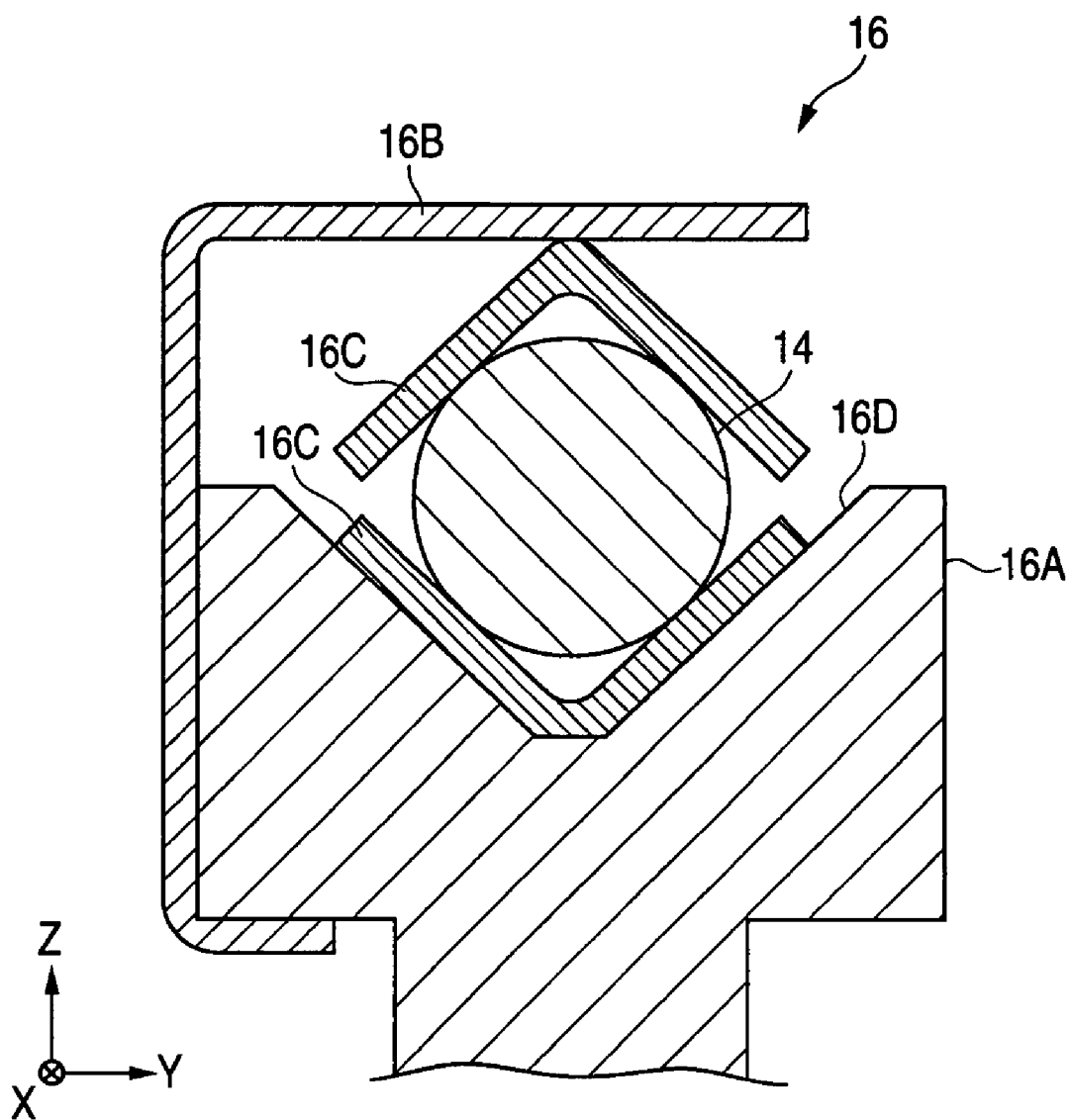
FIG. 8 is a sectional view of a driven member taken along the line VIII-VIII in FIG. 1.

Next, the construction of the driven member 16 will be described in detail by reference to FIG. 8. FIG. 8 is a sectional view of the driven member 16 taken along the line VIII-VIII in FIG. 1. As is shown in FIG. 8, the driven member 16 is made up of, for example, a main body portion 16A, a pressing portion 16B and sliding portions 16C.

The main body portion 16A is pressed against the driving shaft 14 by the pressing portion 16B under a certain determined force. A V-shaped groove 16D is formed in the main body portion 16A. The driving shaft 14 is accommodated within this groove 16D in such a state that the driving shaft 14 is held by the two sliding portions 16C therebetween. The sliding portions 16C, 16C are each a plate element having a V-shaped cross section and are disposed in such a manner as to face each other on respective recessed portion sides so as to hold the driving shaft 14 therebetween. By accommodating the driving shaft 14 within the V-shaped groove 16D, the driven member 16 can be attached to the driving shaft 14 in a stable fashion.

For example, a leaf spring material having an L-shaped cross section is used as the pressing portion 16B. One side of the pressing portion 16B is hooked on the main body portion 16A, while the other side thereof is disposed in a position which faces the groove 16D, whereby the driving shaft 14 which is accommodated within the groove 16D can be held therein by the other side of the pressing portion 16B together with the main body portion 16A and the sliding portions 16. By adopting this configuration, the main body portion 16A can be pressed against the driving shaft 14 side. The driven member 16 is mounted in such a state that the main body portion 16A is pressed against the driving shaft 14 side under the certain determined force by the pressing portion 16B, whereby the driven member 16 is brought into frictional engagement with the driving shaft 14. Namely, the driven shaft 16 is mounted in such a state that the main body portion 16A and the pressing portion 16B are pressed against the driving shaft 14 under the certain determined pressure, so as to produce a certain determined friction force as the driven shaft 16 moves.

In addition, by holding the driving shaft 14 by the sliding portions 16C, 16C which have the V-shaped cross sections, the driven member 16 is made to be brought into linear contact with the driving shaft 14 at a plurality of locations, whereby the driven member 16 can be brought into frictional engagement with the driving shaft 14 in a stable fashion. In addition, since the driven member 16 is in engagement with the driving shaft 14 by virtue of the linear contact state realized at the plurality of locations, an engagement state substantially results which is similar to an engagement state in which the driven member 16 is in surface engagement with the driving shaft 14, thereby making it possible to realize a stable friction engagement therebetween.

Note that while in FIG. 8, the sliding portions 16C are each made up of the plate-shaped element having the V-shaped cross section, the sliding portions 16C may be each made into a plate-shaped element having an arc-shaped cross section, so that the sliding portions are brought into surface contact with the driving shaft 14. In this case, since the driven member 16 is brought into engagement with the driving shaft 14 while realizing the surface contact therebetween, the driven member 16 can be brought into friction engagement with the driving shaft 14 in a stabler fashion.

The partitioning portions 24B, 24C of the driving apparatus 1 that has been described heretofore will be described in detail.

At the partitioning portions 24B, 24C, the driving shaft 14 is accommodated in the V-shaped grooves 25 which are formed in the support portions 24A in such a manner as to extend along the direction of extension of the driving shaft 14 (the X direction) and is biased in a direction towards the V-shaped grooves 25 in the support portions 24A (a Z direction). Because of this, in the driving apparatus 1, the driving shaft 14 which is accommodated on the support portions 24A of the partitioning portions 24B, 24C is allowed to be brought into contact with the support portions 24A and the spring member 26 in such a manner as to produce no gap therebetween, whereby the driving shaft 14 is restrained from moving in a direction of its cross section (a direction of a Y-Z plane) which intersects the axis thereof at right angles.

On the contrary, in the related-art driving apparatus, the driving shaft 14 is passed through the through holes provided in the partitioning portions such as the support plates, and for the reason of improving the workability in passing the driving shaft 14 through the through holes, the cross sectional dimension of the through hole was designed to become larger than the cross sectional dimension of the driving shaft to some extent. Because of this, a gap was produced between the partitioning portion and the driving shaft, whereby the driving shaft was allowed to move in the direction of its cross section which intersected its axis at right angles. As a result, in the related-art driving apparatus, the driving shaft and the actuator could not be supported with good positional accuracy, whereby it was difficult to obtain the stable driving property.

Namely, in the driving unit 1 according to the embodiment of the invention, since the driving shaft 14 is restrained from moving in the direction of its cross section by the partitioning portions 24B, 24C, the driving shaft 14 can be supported in the reciprocating fashion with high positional accuracy, whereby the driving apparatus is realized which has the stable driving property.

On top of this, in the driving apparatus 1, when compared to the related-art driving apparatus in which the through holes were provided in the partitioning portions, the driving shaft 14 and the actuator 10 can be placed easily. Namely, in the related-art driving apparatus, when assembling the driving shaft 14 and the actuator 10 to the stationary frame 24, the driving shaft 14 needed to be passed through the through holes. To make this happen, the accurate work was necessary of aligning the position of the through hole with the position of the driving shaft and passing the driving shaft through the through holes without changing the direction of the driving shaft which is passed through the through holes, and this required quite a large number of labor hours. On the contrary, in the driving apparatus 1 of the embodiment of the invention, when assembling the driving shaft 14 and the actuator 10 to the stationary frame 24, since the driving shaft 14 only has to be simply placed within the V-shape grooves 25 in the support portions 24A and the spring member 26 for biasing the driving shaft 14 so place only has to be mounted on the stationary frame 24, the aforesaid accurate work is not necessary, and the driving shaft 14 and the actuator 10 can easily be placed from one direction (for example, from above the support portions 24A).

Note that while in the description that has been made heretofore, the grooves formed in the support portions 24A are described as being formed into the V-shape grooves 25, rectangular grooves 25A may be formed in the support portions 24A. In this case, too, since the driving shaft 14 accommodated in the support portions 24A of the partitioning portions 24B, 24C is restrained from moving in the direction of its cross section which intersects the axis thereof at right angles by virtue of the biasing force of the spring member 26, a similar advantage to the advantage that has been described above can be obtained. However, as to the shape of the grooves formed in the support portions 24A, the V-shape grooves are preferable to the rectangular grooves in that the driving shaft 14 can be supported in the reciprocating fashion with higher positional accuracy.

Figure 11:
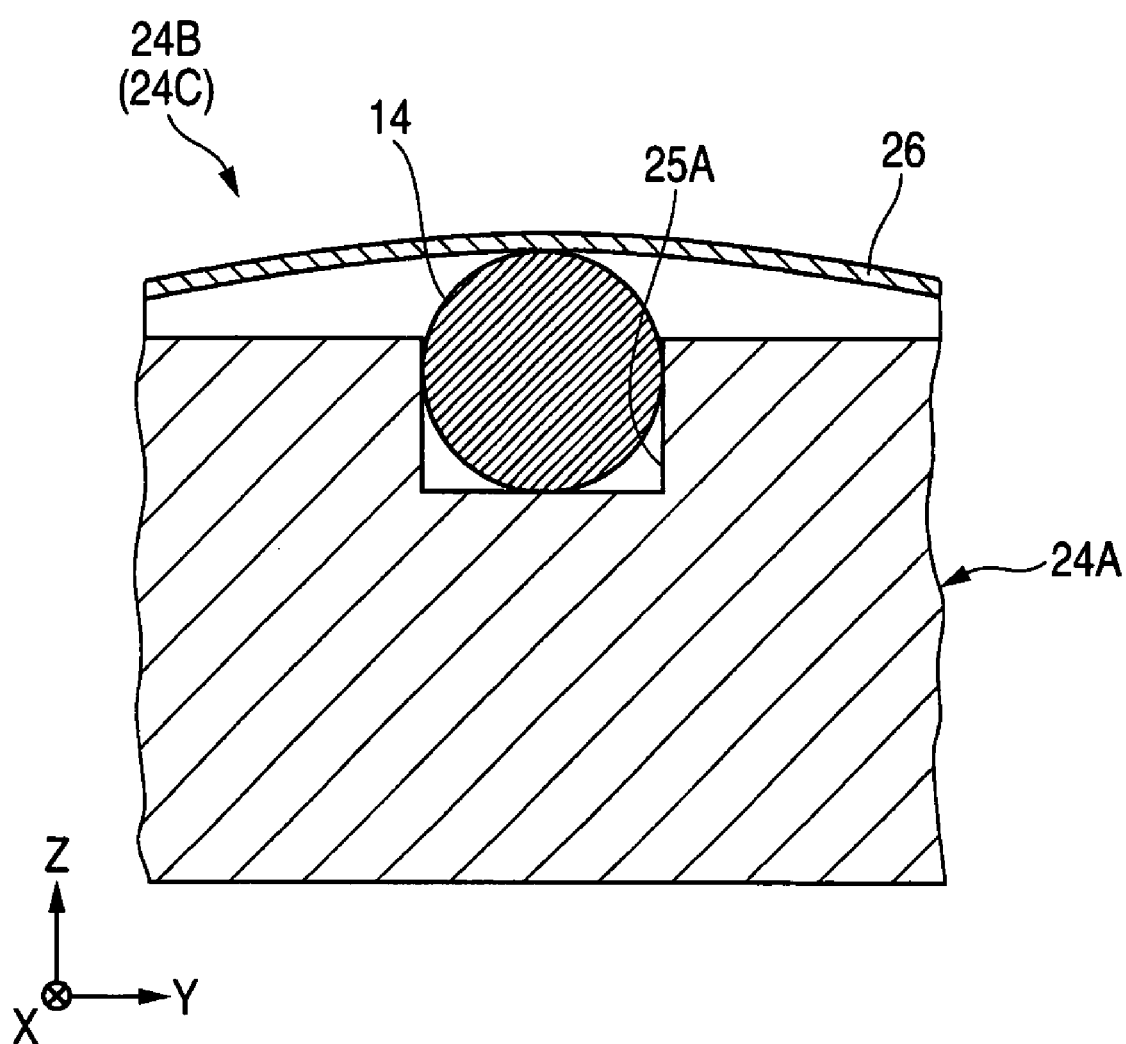
FIG. 11 is a sectional view showing a partitioning portion of a different form from the partitioning portion in FIG. 10.

In addition, a construction may be adopted in which only either of the partitioning portions 24B, 24C has the support portion 24A and the spring member 26 (that is, the construction shown in FIG. 10 or 11). With at least the partitioning portion which is so constructed, the driving shaft 14 is supported in the reciprocating fashion with higher positional accuracy. However, as with the driving apparatus 1, by supporting the driving shaft 14 in the reciprocating fashion by both the partitioning portions 24B, 24C at both the end portions 14a, 14b of the driving shaft 14, respectively, the whole of the driving shaft 14 is allowed to be supported with high positional accuracy.

In addition, while in the embodiment that has been described heretofore, only the case is described in which the partitioning portions 24B, 24C are integral with the stationary frame 24, partitioning portions 24B, 24C which are separate from the stationary frame 24 may be provided to be mounted on the stationary frame 24. Even in the event that the partitioning portions 24B, 24C are provided separately from the stationary frame 24, a similar function and advantage to those obtained when they are integral with the stationary frame 24 can be obtained.

Additionally, in the driving apparatus 1, while vibrations are generated by virtue of the extension and contraction of the piezoelectric element 12 when the piezoelectric element extends and contracts, since the actuator 10 which includes the piezoelectric element 12 is supported by the support member 60 from the sides thereof relative to the direction of extension and contraction of the piezoelectric element 12, the vibrations which are generated by virtue of the extension and contraction of the piezoelectric element 12 are made difficult to be transmitted to the outside of the actuator 10. Because of this, the resonance of the actuator 10 together with the external member such as the stationary frame 24 can be suppressed, thereby making it possible to reduce the effect of resonance. Consequently, the driven member 16 and the movable lens 70 can be caused to move accurately.

Note that as an application of the driving apparatus 1, the driving apparatus 1 can be applied to small precision equipment such as a digital camera, a mobile phone with a camera and the like. In particular, while the mobile phone needs to be driven at a low voltage such as 3 V or less, by using the driving apparatus 1 therein, the mobile phone can be driven at a high frequency of the order of 20 kHz, and the driven member 16 can be caused to move at a high speed of 2 mm/s or faster. Consequently, even a zoom lens can be caused to move quickly which needs to move on the order of 10 mm. In addition, the application of the actuator 10 according to the invention is not limited to the application in which the actuator 10 is used to move the movable lens such as a focusing lens or a zoom lens, and hence, the actuator 10 may be used, for example, to move a CCD.

The embodiments that have been described heretofore are such as to illustrate one example of the driving apparatus according to the invention. The driving apparatus according to the invention is not limited thereto, and hence, the driving apparatus according to the embodiments may be modified or applied to any other applications without departing from the sprit and scope of the individual claims of the invention.

In addition, while the invention has been described as being applied to only the device in which the invention is applied to the driving apparatus for driving the movable lens, the invention may be applied to a driving apparatus for driving other things than the movable lens (for example, the lens frame which holds the movable lens). Furthermore, while in the embodiment, the weight member 18 is provided on the other end side in the direction of extension and contraction of the piezoelectric element 12 and is particularly preferably soft and heavy, the weight member 18 is not limited thereto.

Additionally, while the moving property of the driving shaft 14 in the direction of extension and contraction of the piezoelectric element 12 is attempted to be enhanced further by the weight member 18, the weight member 18 may not be provided. Furthermore, while in the embodiment, the frequency of the pulse voltage that is impressed to the piezoelectric element 12 is made to be equal between the case where the movable lens 70 moves forwards and the case where it moves backwards, different frequencies may be used.

In addition, while the piezoelectric element 12 is used as the electro-mechanical conversion element, any other thing may be used, provided that it can extend and contract when electric signals are inputted, and for example, an artificial muscle polymer or the like may be used.

While in the embodiment, the other end side of the piezoelectric element 12 in the direction of extension and contraction thereof is made to constitute a free end, an end portion of the other end side of the piezoelectric element 12 may be fixed to the stationary frame 24 so as to constitute a fixed end. In addition, while in the embodiment, as the particularly preferred example, the electro-mechanical conversion element 12 is elastically supported on the stationary frame 24 via the adhesive having the elasticity, the electro-mechanical conversion element 12 may be supported on the stationary frame 24 via a hard adhesive although the effect is slightly reduced.

According to the invention, the driving apparatus is provided in which the driving shaft can be supported in the reciprocating fashion with high positional accuracy.

The entire disclosure of each and every foreign patent application from which the benefit of foreign priority has been claimed in the present application is incorporated herein by reference, as if fully set forth.

What is claimed is:

1. A driving apparatus comprising:
an electro-mechanical conversion element;
a driving shaft that reciprocates in response to an extension and contraction of the electro-mechanical conversion element, the driving shaft being secured to one end of the electro-mechanical conversion element;
a weight member secured to an opposing end of the electro-mechanical conversion element;
a driven member, frictionally engaged with the driving shaft, that moves along the driving shaft by reciprocating the driving shaft; and
at least one shaft support portion each including a groove portion that accommodates therein the driving shaft and a spring member that biases the driving shaft accommodated in the groove portion to a direction of the groove portion, wherein
a weight of the weight member is greater than that of the driving shaft.

2. The driving apparatus as set forth in claim 1, wherein said at least one shaft support portion comprises two shaft support portions, and
the driving shaft is supported in a reciprocating fashion at both end portions of the driving shaft by the two shaft support portions.

3. The driving apparatus as set forth in claim 1, wherein the groove portion comprises a groove having substantially a V-shape.

4. The driving apparatus as set forth in claim 1, wherein the electro-mechanical conversion element is supported on a stationary frame via a continuous support member having a through hole, and
the electro-mechanical element is accommodated within the through hole.

5. The driving apparatus as set forth in claim 1, wherein the specific weight of the weight member divided by Young's modulus is equal to or larger than $1.8 \times 10^{-9}$.

* * * * *